UNITED STATES PATENT OFFICE.

HENRY W. REDDAN, OF SAN FRANCISCO, CALIFORNIA.

COMPOSITION FOR LUBRICATING AXLES.

SPECIFICATION forming part of Letters Patent No. 276,711, dated May 1, 1883.

Application filed March 5, 1883. (No specimens.)

*To all whom it may concern:*

Be it known that I, HENRY WATSON REDDAN, a citizen of the United States, residing at San Francisco, in the county of San Francisco and State of California, have invented a new and useful Composition of Matter for Lubricating Axles, of which the following is a specification.

My composition consists of the following ingredients, combined in the proportions stated, viz: tallow, one hundred pounds; rape-seed oil, one hundred pounds; light-brown North Carolina rosin, one hundred pounds. These ingredients are thoroughly incorporated together by melting and boiling in a kettle, and then poured into cans or other vessels for use.

In using the above-named composition for axle-lubrication the axle is first cleaned of all extraneous matter and the lubricant applied in the usual way. When thus mixed or compounded this lubricant will remain much longer upon the axle, and will not wear away so readily as other lubricants, and is not easily melted off the axle by heat, which is so incident to friction of the boxings.

I am aware that some of these ingredients have been used for lubricating purposes, but am not aware that all of the ingredients of my composition, in the proportions stated, have been used together.

What I claim, and desire to secure by Letters Patent of the United States, is—

The herein-described composition of matter to be used for lubricating purposes, consisting of tallow, rape-seed oil, and rosin, in the proportions specified.

In testimony that I claim the foregoing I have hereunto set my hand and seal.

HENRY WATSON REDDAN. [L. S.]

Witnesses:
 C. W. M. SMITH,
 CHAS. E. KELLY.